United States Patent [19]

Abe et al.

[11] 4,041,137

[45] Aug. 9, 1977

[54] METHOD OF PRODUCING ALUMINUM FLUORIDE

[75] Inventors: Tatsuo Abe, Kasugai; Toshiki Okamoto, Nagaya; Takao Sakakura, Nagaya; Tatsuo Tateno, Nagaya, all of Japan

[73] Assignee: Sumitomo Aluminum Smelting Company, Ltd., Osaka, Japan

[21] Appl. No.: 670,215

[22] Filed: Mar. 25, 1976

[30] Foreign Application Priority Data

Mar. 25, 1975  Japan .................................. 50-36361

[51] Int. Cl.² ............................................. C01F 7/50
[52] U.S. Cl. ..................................... 423/489; 423/240
[58] Field of Search .............................. 423/489, 240

[56] References Cited

U.S. PATENT DOCUMENTS

| 1,851,475 | 3/1932 | Zimmermann | 423/489 |
| 2,813,000 | 11/1957 | Quittenton | 423/240 |
| 3,836,635 | 9/1974 | Reh et al. | 423/489 |
| 3,907,971 | 9/1975 | Bohm et al. | 423/489 |

FOREIGN PATENT DOCUMENTS

| 1,175,085 | 12/1969 | United Kingdom | 423/489 |

*Primary Examiner*—Edward Stern
*Attorney, Agent, or Firm*—Sughrue, Rothwell, Mion, Zinn and Macpeak

[57] ABSTRACT

In the production of aluminum fluoride, a fluorine compound is absorbed from a gas containing the fluorine compound into a gas absorbing liquor comprising water containing alumina or hydrated alumina, or an aqueous aluminum fluoride solution containing alumina or hydrated alumina, and the absorbed fluorine compound is reacted with alumina or hydrated alumina to precipitate hydrated aluminum fluoride of high quality.

18 Claims, 2 Drawing Figures

METHOD OF PRODUCING ALUMINUM FLUORIDE

BACKGROUND OF THE INVENTION

1. Field of the Invention

The present invention relates to a method of producing aluminum fuoride. More particularly, it relates to a method of producing high purity aluminum fluoride with excellent efficiency from a gas containing a low concentration of a fluorine compound, for example, the off gas from an aluminum electrolytic cell.

2. Description of the Prior Art

Conventional industrial processes of producing aluminum fluoride can be roughly divided into the following two methods.

First, one widely commercialized method comprises absorbing a gas containing hydrogen fluoride at a relatively high conconcentration, e.g., the gas which results from the decomposition of a fluorite with sulfuric acid at elevated temperatures, into water, thereby obtaining a 15 to 25 % by weight aqueous hydrofluoric acid solution, and reacting the solution with alumina or hydrated alumina to obtain aluminum fluoride trihydrate. The concentration of hydrogen fluoride gas which results from the decomposition of a florite with sulfuric acid at elevated temperatures varies greatly. Generally, the fluorine concentration is around about 300 g/Nm³. This reaction is shown by Formulae (1) and (2).

$$HF(gas) + H_2O \rightarrow HF(soln) + SiO_2 \qquad (1)$$
$$3HF(soln) + Al(OH)_3 \rightarrow AlF_3 \cdot 3H_2O \qquad (2)$$

This reaction will be explained in detail hereinafter on the basis of these formulae, with reference to the case where alumina trihydrate, that is, aluminum hydroxide, is used as the alumina or hydrated alumina.

Further, the direct solid-gas contact reaction between hydrogen fluoride gas and alumina or hydrated alumina (dry method) is also included in this category.

The second method comprises absorbing an off-gas containing silicon tetrafluoride, e.g., which results from a phosphate rock treatment, into water, thereby obtaining about a 15% by weight aqueous hydrosilicofluoric acid solution, and then reacting the solution with alumina or hydrated alumina to obtain aluminum fluoride trihydrate. This reaction is as shown by Formulae (3) and (4).

$$3SiF_4(gas) + 2H_2O \rightarrow 2H_2SiF_6(soln) + SiO_2 \qquad (3)$$
$$H_2SiF_6(soln) + 2Al(OH)_3 + 2H_2O \rightarrow 2AlF_3\cdot 3H_2O + SiO_2 \qquad (4)$$

The first method is disadvantageous from the economical point of view because gases of a high hydrogen fluoride concentration must be used as a starting material. On the other hand, the second method is economically advantageous in that off-gases from a phosphate rock treatment can be used as a starting material. Even in the latter method, however, the fluorine concentration of the gas must be higher than a certain level, e.g., about 2 to about 3 g/Nm³. When gases of a low fluorine concentration, such as the off gas from an aluminum electrolytic cell, are absorbed into water by the method described above, the aqueous solutions obtained have a hydrofluoric acid concentration of only 3 to 5 % by weight. Such solutions only yield a supersaturated solution of aluminum fluoride when reacted with alumina or hydrated alumina and produce no precipitates of aluminum fluoride trihydrate.

When such a supersaturated solution is heated to 80° to 90° C and aluminum fluoride or the hydrate thereof is added as precipitation nuclei, the precipitation of aluminum fluoride trihydrate occurs at an extremely slow rate, leaving some aluminum fluoride still dissolved in the solution.

Consequently, this method is very unsatisfactory as an industrial method for the production of aluminum fluoride.

On the other hand, a precipitation method which comprises adding alumina as precipitation nuclei to a supersaturated solution of aluminum fluoride, thereby precipitating aluminum fluoride trihydrate, is disclosed in U.S. Pat. No. 3,533,924. According to this method, the aluminum fluoride trihydrate can be precipitated at high yield by a simple operation by reacting aluminum hydroxide with about 3 to 5% by weight aqueous hydrofluoric acid solution which is obtained by washing the off gas from an aluminum electrolytic cell with water, thereby preparing a supersaturated solution of aluminum fluoride, and then by adding alumina to the resulting solution. However, in order to enhance the precipitation efficiency of aluminum fluoride trihydrate, alumina must be added in a large amount and almost all of the alumina is deposited as a co-precipitate comprising alumina and aluminum fluoride.

Consequently, a large size treating equipment is required and the product obtained contains an extremely high amount of alumina which is very difficult to remove, and, therefore, which limits usage of the product.

Other methods are known for the production of aluminum fluoride from gases having low concentrations of fluorine compounds. For example, the precipitation of hydrated aluminum fluoride can be effected by concentrating an aqueous solution having a low concentration of fluorine compounds which is obtained by a simple absorption of the gases by water and then adding alumina or hydrated alumina into the concentrated solution or by concentrating the aqueous solution having a low concentration of aluminum fluoride which is obtained by the addition of alumina or hydrated alumina to the aqueous solution having a low concentration of fluorine compounds.

These methods are, however, disadvantageous from the economical point of view because they require complicated concentration operations, and, therefore, entail high equipment costs.

As described above, following the prior art it is very difficult to produce high purity aluminum fluoride economically, efficiently and on an industrial scale, from gases of a low fluorine concentration.

Therefore, most of the fluorine compounds which are contained in such gases of low fluorine concentration or in solutions obtained by the absorption of such gases by water have been recovered as calcium fluoride or cryolite, whereby air pollution or waste water pollution has been prevented from occurring.

In the aqueous solutions obtained by a simple absorption of fluorine compound containing gases by water, that is, by a simple absorption which is not accompanied by reaction (for example, the formation of hydrofluoric acid by the absorption of hydrogen fluoride gas by water), the concentration of the fluorine compound is entirely fixed by the partial pressure equilibrium of the compound which is present between the gas phase and the liquid phase in the absorption system.

Therefore, when the gas absorbed has a low fluorine concentration, the aqueous solution obtained by a simple absorption of the gas by water has only a low fluorine concentration. Consequently, the addition of alumina or hydrated alumina to the thus obtained solution results in a supersaturated solution of aluminum fluoride from which high purity, solid aluminum fluoride cannot be obtained with a high efficiency.

In conventional methods, no attention has been given to the gas absorption step, and, therefore, no improvements in this step have been effected by the art.

Summary of the Invention

One object of the present invention is to provide a method for producing high purity aluminum fluoride at high efficiency from a fluorine compound containing gas having a low fluorine concentration.

Another object of the present invention is to provide a method for recovering a fluorine compound from a gas containing the fluorine compound, such as the off gas from an aluminum electrolytic cell, thereby preventing environmental pollution from occurring, and, at the same time, for producing useful aluminum fluoride from the fluorine compound containing gas.

Still a further object of the present invention is to provide a method for absorbing a fluorine compound containing gas into a suitable solution which is treated so that the partial pressure of the fluorine compound present in the gas does not increase in the liquid phase, thereby producing aluminum fluoride.

Hereafter the term fluorine compound includes one compound and a mixture of fluorine compounds.

The inventors have studied methods for the extraction of a fluorine compound from a gas containing the fluorine compound into a liquid medium under conditions such that the partial pressure of the fluorine compound is not increased in the liquid phase. As the result, the inventors found a method which comprises:

(1) absorbing a fluorine compound containing gas into a gas absorbing liquor which comprises either water containing alumina or hydrated alumina or an aqueous aluminum fluoride solution containing alumina or hydrated alumina, whereby the fluorine compound absorbed by the liquor and reacted with alumina or hydrated alumina is converted to aluminum fluoride and precipitated in situ; or (2) absorbing the gas containing a fluorine compound into a gas absorbing liquor which comprises either water containing alumina or hydrated alumina, an aqueous aluminum fluoride solution or an aqueous aluminum fluoride solution containing alumina or hydrated alumina, and thereafter supplying the shortage of alumina or hydrated alumina to the liquor, thereby precipitating the aluminum fluoride.

In the present invention, therefore, reaction between the fluorine compound in the gas and alumina or hydrated alumina in the gas absorbing liquor is carried out immediately after the absorption of the fluorine compound by the liquor. In this way, the partial pressure of the fluorine compound does not increase in the liquid phase, whereby the absorption and reaction of the fluorine in the liquid phase proceeds in a steady fashion.

DETAILED DESCRIPTION OF THE INVENTION

Typical examples of fluorine compounds present in gases treated in the present invention are hydrogen fluoride (HF), silicon tetrafluoride ($SiF_4$), $F_2$, etc. For example, fluorine compounds in the off gas resulting from an aluminum electrolytic cell mainly include hydrogen fluoride (HF) and trace amounts of other compounds such as cryolite ($Na_3AlF_6$), fluorite ($CaF_2$), $AlF_3$, etc. in dust form. These other compounds do not react when they are dissolved in the gas absorbing liquor. Further, fluorine compounds in the off gas resulting from a phosphate rock treatment mainly include silicon tetrafluoride and a trace amount of hydrogen fluoride.

If the fluorine concentration (as F) in the gas is too low, the purity of the aluminum fluoride produced decreases. Therefore, it is preferred to use a gas of a fluorine concentration of more than about 0.05 g/Nm$^3$. For example, the fluorine concentration in the off gas from an aluminum electrolytic cell varies depending upon the kind of cell used. For example, the fluorine concentration of the off gas from an aluminum electrolytic cell is about 0.05 to about 0.2 g/Nm$^3$ (as F) for a prebaked anode type and about 0.5 to about 2 g/Nm$^3$ (as F) for a Soderberg anode type, whereas the fluorine concentration of the off gas from a phosphate rock treatment is about 2 to about 5 g/Nm$^3$ (as F), where the above values are calculated as gaseous fluorine and fluorine in dust form is excluded therefrom. Hereafter, the gas concentration is designated as "F" throughout the specification. The gas which carries a fluorine compound is generally air.

It should be clearly understood, however, that the present invention is not limited to the treatment of the above types of fluorine compound containing gases, nor is the present invention limited to fluorine compound containing gases of the above concentration, i.e., the process of the present invention is applicable to fluorine compound containing gases of any concentration wherein the fluorine compounds can react with alumina, though the present invention is particularly effective with low fluorine compound concentration gases as exemplified above.

The present invention will be illustrated in detail with reference to the accompanying drawings; however these drawings are not to be construed as limiting the scope of the invention.

Figure 1:
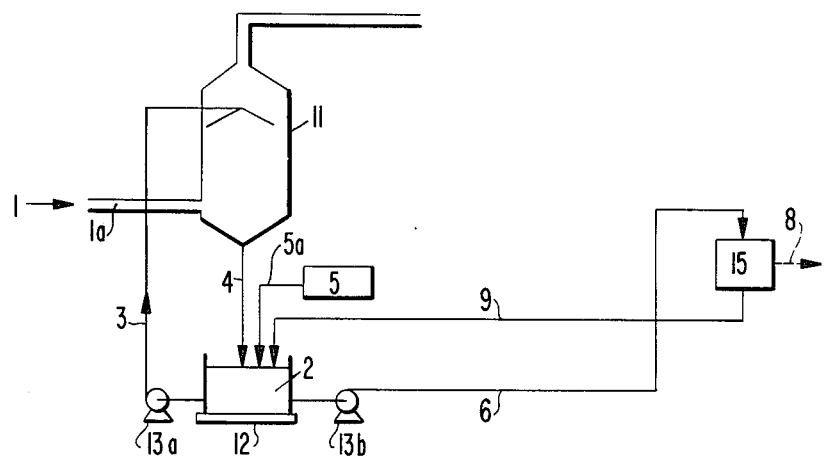
FIG. 1 is a flow sheet for the production of aluminum fluoride in one embodiment according to the present invention.

FIG. 1 will firstly be discussed.

A fluorine compound containing gas 1 as a starting material is introduced into a gas absorber 11 via conduit 1a and absorbed therein into a gas absorbing liquor. The gasliquid contacting procedure employed in the present invention is not specifically limited. That is, conditions and apparatus used in a conventional gas-liquid contacting process can be utilized such that the gas sufficiently contacts the liquid. In the present invention, both bubbling and spraying, for example, can be used.

In general, a gas having a fluorine concentration of less than about 10 g/Nm$^3$ is absorbed in water with a low absorption efficiency. When a gas has a fluorine concentration of less than 2 g/Nm$^3$, little or no precipitation of hydrated aluminum fluoride occurs by reaction between alumina or hydrated alumina and the solution obtained by a simple absorption of the fluorine compound from the gas by water. The method of the present invention is effective with such a gas having a low fluorine concentration as a starting material.

A gas absorbing liquor 2 stored in tank 12 is introduced into gas absorber 11 via conduit 3 by means of pump 13a and absorbs the gas. The liquor, after absorbing the fluorine compound from the gas at 11, is returned to tank 12 via conduit 4.

As gas absorber 11, any apparatus which is employed in a conventional gas-liquid absorption process, e.g., a spray tower, a venturi scrubber, a turbulent contact absorber, a bubbling tower, etc., can be employed in the present invention. In the gas-liquid contact of the present invention, both cocurrent and counter-current processes may be used, with counter-current processes being preferred from the viewpoint of absorption efficiency.

The gas absorption conditions employed vary depending upon the kind of apparatus used and are not particularly limited. In general, the proportion of the absorbing liquor to the gas is about 0.2 to about 20 $l/Nm^3$; the pressure inside the absorbing apparatus is about 20 to about 2000 mm $H_2O$ below atmospheric pressure; and the contact time is about 0.2 to about 20 seconds. When a spray tower is employed, the spraying pressure is about $+.1$ to about $+5$ $Kg/cm^2$ based on the pressure inside the tower. Also, the residence time of circulating in conduits 3 and 4, absorption tower 11 and tank 12 varies depending upon the kind of absorption tower used, and generally ranges from about 1 second to about 2 minutes.

When gas absorbing liquor 2 is water which contains alumina or hydrated alumina, the fluorine compound in the gas is absorbed into the water and then the absorbed fluorine compound reacts with the alumina or hydrated alumina, whereby aluminum fluoride is formed. When the resulting aqueous solution is circulated through conduits 3 and 4, the aluminum fluoride concentration of the solution steadily increases and hydrated aluminum fluoride is finally precipitated out.

The alumina or hydrated alumina is used in order to react it with the fluorine compound in the gas to thereby form aluminum fluoride. The type of alumina or the water of crystallization number in the hydrated alumina is not particularly limited. It is, however, preferred in terms of reactivity to use alumina hydrate, particularly alumina trihydrate, that is, aluminum hydroxide.

Alumina or hydrated alumina is charged through from storage means 5 via conduit 5a continuously or intermittently. In this case, the added alumina or hydrated alumina is easily dissolved in the gas absorbing liquor, if the amount is not excessively large, because the liquor becomes acidic due to the aluminum fluoride formed or the unreacted hydrofluoric acid present in addition to the fluoride, i.e., the gas absorbing liquor becomes an aqueous aluminum fluoride solution containing added alumina or hydrated alumina. That is, the gas absorbing liquor becomes acidic, i.e., the pH becomes less than 7. It is preferred from the viewpoint of dissolving the alumina or hydrated alumina and the precipitation of aluminum fluoride trihydrate to fix the pH of the gas absorbing liquor at less than about 6, most preferably 1 to 5.5.

The addition of all of the alumina or hydrated alumina at the beginning of the process is not always necessary. For example, when aqueous solutions having certain concentrations of a fluorine compound, for example, an aqueous hydrofluoric acid solution, have been formed by a simple absorption of gases containing the fluorine compound by water, the alumina or hydrated alumina may first be added in an amount sufficient to react with the resulting aqueous solutions and further required for the subsequent gas absorption to be continued by the process described hereinbefore. In this case, the gas absorbing liquor becomes an aqueous aluminum fluoride solution containing added alumina or hydrated alumina. Considering the solubility and reactivity of the added alumina or hydrated alumina, it is preferred to use alumina or hydrated alumina having a maximum particle size of less than about 300 $\mu$. As previously set forth, since alumina or hydrated alumina reacts with hydrofluoric acid to convert the same into aluminum fluoride and accordingly alumina or hydrated alumina do not always exist in a free state in the gas absorbing liquor, the concentration thereof cannot unequivocally be set, i.e., alumina or hydrated alumina is not necessarily always present per se in the gas absorbing liquor. In general, however, the concentration is preferably lower than about 10% by weight, most preferably 0.01 to 1% by weight based on the total weight of the absorbing liquor and all components therein. Further, if the absorption is continued, the concentration of aluminum fluoride increases to about 0.5 to about 15 % by weight, same basis, since the concentration of aluminum fluoride increases in the absorbing liquor.

The resulting slurry containing the hydrated aluminum fluoride precipitate is continuously filtered or filtered batch-wise in a conventional manner and the precipitates are calcined into anhydrous aluminum fluoride.

In FIG. 1, the resulting slurry is fed to a filter 15 via conduit 6 by means of a pump 13b and filtered therein. The filtered precipitates are taken out via conduit 8 and converted in a conventional manner to anhydrous aluminum fluoride by calcination at about 300° to about 600° C in a furnace. In the calcination of the present invention, a conventional calcination apparatus, e.g., an electric cell, a rotary kiln, etc., can be employed. The calcination is preferably carried out at substantially atmospheric pressure for about 1 to about 15 hours in air.

The filtrate from filter 15 contains about 1 to about 5% by weight of unprecipitated aluminum fluoride, and, therefore, it is preferred to return the filtrate to gas absorbing liquor 2 via conduit 9, i.e., to recycle the same. The concentration of the unprecipitated aluminum fluoride present in the filtrate depends upon the reaction conditions, however, it can be decreased, as is well known, by elevating the temperature of the liquor or by stirring the liquor thoroughly. However, even if the filtrate has an aluminum fluoride concentration of about 5% by weight, it can be disposed of, irrespective of the reaction conditions, by combining it with the gas absorbing liquor and recycling. Thus, waste water treatment becomes unnecessary and the total yield of aluminum fluoride reaches approximately 100%. Further, it is preferred that the gas absorbing liquor have a high aluminum fluoride concentration, and from this point, the reaction conditions described above are not overly critical.

Figure 2:
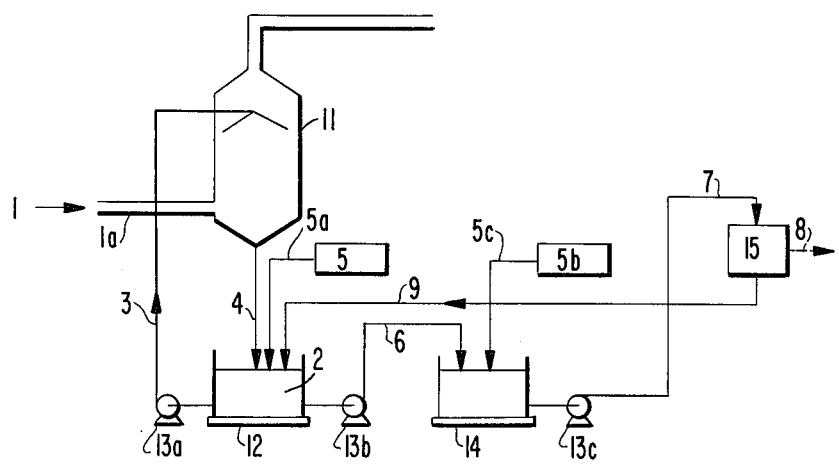
FIG. 2 is a flow sheet for the production of aluminum fluoride in another embodiment according to the present invention.

Referring now to FIG. 2, the gas absorption process per se is the same as in FIG. 1, where like numerals to those in FIG. 1 are used to identify like elements, but the embodiment of FIG. 2 is characterized in that an aluminum fluoride containing solution 2 (namely, a gas absorbing liquor) obtained in the process is forward to reactor 14 via conduit 6 and is completely reacted therein with additional alumina or hydrated alumina forwarded from storage tank 5b via conduit 5c, whereby hydrated aluminum fluoride is precipitated. In FIG. 2, therefore, a pump 13c which sends the reaction solution from reactor 14 to a filter 15 via conduit 7 are additionally provided. , In the gas absorption process shown in FIG. 1, the reaction is perfectly carried out in tank 12 to precipitate hydrated aluminum fluoride in situ, and the reaction solution obtained as such is used as a gas absorbing liquor. Therefore, a liquor of a high slurry concentration must be recycled via conduits 3 and 4, which is disadvantageous in that deposits of hydrated aluminum fluoride are apt to adhere to the inner wall of the gas absorbing tower 11 and tank 12.

On the other hand, as described hereinafter, the process in FIG. 2 is conducted so that precipitation of the hydrate is minimized in tower 11 and tank 12. The gas absorption is carried out using a gas absorbing liquor 2 which contains alumina or hydrated alumina charged from storage tank 5 in a smaller amount than that stoichiometrically required based on the fluorine in the gas. The solution in tank 12 is sent to reactor 14 continuously or intermittently and the unreacted fluorine compound in the solution is completely reacted with additional alumina or hydrated alumina charged from storage tank 5b, whereby hydrated aluminum fluoride is precipitated. The reaction conditions in reactor 14 are not particularly limited. In general, in order to effectively precipitate aluminum fluoride trihydrate, the reaction temperature and time are preferably set at about 40° to about 70° C and about 3 to about 30 hours, respectively.

Other processing are the same as in FIG. 1, for example, there is no need to add the total amount of alumina or hydrated alumina charged from storage tank 5 to a gas absorbing liquor 2 at the beginning of the process. The alumina or hydrated alumina charged from storage tank 5 may be added after the gas absorbing liquor having a certain fluorine concentration has first been prepared by a simple absorption of the gas by water.

After the precipitates of hydrated aluminum fluoride have been filtered on filter 15, it is preferred to return the filtrate containing unprecipitated aluminum fluoride to the gas absorbing liquor 2. In this case, since the filtrate itself corresponds to the gas absorbing liquor which is an aqueous aluminum fluoride solution, the addition of alumina or hydrated alumina from storage tank 5 to gas absorbing liquor 2 is not necessary. That is, when the aqueous aluminum fluoride solution is used as the gas absorbing liquor, the concentration of fluorine in the liquor is increased by absorbing the fluorine compound containing gas 1, so that the precipitation of hydrated aluminum fluoride easily occurs in the reactor 14 by reacting the fluorine compound with alumina or hydrated alumina, whereby the total aluminum fluoride concentration in the liquor is increased. However, taking the gas absorption efficiency and reaction efficiency into account, it is preferred to previously add some amount of alumina or hydrated alumina to gas absorbing liquor 2. The amount of alumina or hydrated alumina added depends upon the fluorine concentration in the gas, and experimental results have shown that good results are obtained by adding alumina or hydrated alumina in two portions, the first portion being added from storage tank 5 in an amount of 20 to 80% by weight of that stoichrometrically required, based on the fluorine absorbed by the gas absorbing liquor, and the remaining portion being added from storage tank 5b.

The total amount of alumina or hydrated alumina can be at least the stoichrometric amount. Generally, for example, 1 to about 2 times as much as the stoichrometric amount is preferred in terms of reactivity. A large excess is not desirable because the purity of the aluminum fluoride as a final product decreases. Consequently, the total amount of alumina or hydrated alumina added is most preferably 1 to about 1.5 times as much as the stoichrometric amount. This is also the same as with the embodiment of FIG. 1.

As explained in detail hereinbefore, the process of the present invention can be used as a continuous process. Further, since all the aqueous aluminum fluoride solutions can be recycled for reuse, recovery of aluminum fluoride can be increased (the recovery comes close to 100% with continuous operation) and waste water treatment becomes unnecessary.

Moreover, various operations employed in the conventional production of aluminum fluoride, for example heating of supersaturated solutions of aluminum fluoride, addition of precipitation nuclei and the like, become unnecessary, and, therefore, the process becomes much simpler.

As described above, the method of the present invention is particularly effective for the production of aluminum fluoride from gases having a low fluorine concentration, for example, off gases from an aluminum electrolytic cell, off gases from a phosphate rock treatment and the like. Further, the present invention is applicable to gases having a high fluorine concentration, for example, those having a high hydrogen fluoride concentration, which are obtained from the conventional high temperature decomposition of fluorite with sulfuric acid.

The present invention will now be illustrated with reference to the following Examples, which are not, however, to be interpreted as limiting the invention. In these Examples, all gas absorbing liquors are, essentially, water containing the recited components, and temperatures and pressures employed are room temperature and atmospheric pressure, respectively, unless otherwise indicated.

Example 1

The off gas from an aluminum electrolytic cell having a fluorine concentration of 0.9 g/Nm$^3$ (as F; 99+% by weight present as hydrogen fluoride) was continuously introduced into a gas absorbing tower (bubbling type) at a rate of 1.5 Nm$^3$/hr for 10 days where the off gas was absorbed by 5 liters of the gas absorbing liquor. The carrier gas was air, and the pressure inside the gas absorber was set at 100 mm H$_2$O below atmospheric pressure. The contact time was 1 to 2 seconds. In this particular example, the off gas from the aluminum electrolytic cell was bubbled through the gas absorbing liquor. During that time 44 g/day of aluminum hydroxide was added to the gas absorbing liquor at a constant rate. In the normal state, the gas absorbing liquor contained about 4% by weight of dissolved aluminum fluoride and about 0.3% by weight of aluminum fluoride. As a result, the fluorine absorption efficiency was more than 99% at a reaction temperature of 20° to 30° C, and 410 g of precipitates were obtained after 10 days.

The precipitates proved to be almost pure aluminum fluoride trihydrate as a result of X-ray diffraction analysis. Upon calcining the precipitates at 500° C for 5 hours in air in an electric cell, anhydrous aluminum fluoride of 93% by weight purity was obtained.

Example 2

The off gas from an aluminum electrolytic cell having a fluorine concentration of 0.9 g/Nm$^3$ (as F; 99+% by weight present as hydrogen fluoride) was continuously introduced into a gas absorbing tower (counter-current spray tower) at a rate of 2,400 Nm$^3$/hr. The carrier gas was air, and the pressure inside the spray tower was set at 300 mm H$_2$O below atmospheric pressure, with the spraying pressure being set at +0.5 kg/cm$^2$ based on the pressure inside the tower. The contact ratio of the liquor to the gas was 3 l/Nm$^3$ and the contact time was 4 to 6 seconds. In this example, and in Example 3, the off gas from the aluminum electrolytic cell was contacted with a spray of the absorbing liquor. Such a procedure is exemplified in FIGS. 1 and 2 of the attached drawings. During that time, alumina was continuously supplied to the gas absorbing liquor at a proportion of 2.0 kg/hr, which corresponded to 1.1 times that stoichiometrically required based on the fluorine absorbed. In the normal state, the gas absorbing liquor contained about 4% by weight of dissolved aluminum fluoride and about 0.5% by weight of alumina. The gas absorption proceeded with a fluorine absorption efficiency of 97%. As a result of 2 months operation, white crystals of aluminum fluoride trihydrate were continuously obtained at a rate of 5.2 kg/hr in the normal state at a reaction temperature of 40° C.

This slurry was continuously removed and filtered into a solid portion and a liquid portion. The liquid portion, a filtrate which contained about 4% by weight of aluminum fluoride, was recycled to the gas absorption process and the solid portion, which was almost pure aluminum fluoride trihydrate, was calcined at a maximum temperature of 500° C in a rotary kiln for 5 hours in air to obtain anhydrous aluminum fluoride of 89% by weight purity.

Example 3

The same off gas from an aluminum electrolytic cell as was treated in Example 2 was introduced into a gas absorbing tower (counter-current spray tower) at the same rate as in Example 2. During that time, aluminum hydroxide was continuously supplied to the gas absorbing liquor at a proportion of 1.3 kg/hr, which corresponded to ½ the equivalent of that stoichrometrically required based on the fluorine absorbed. In the normal state, the gas absorbing liquor contained about 4% by weight of dissolved aluminum fluoride and about 0.1% by weight of aluminum hydroxide. The gas absorption proceeded with a fluorine absorption efficiency of 90%. At a reaction temperature of 40° C, the resulting aqueous solution contained fluorine compounds mainly comprising aluminum fluoride and hydrofluoric acid, and the total fluorine concentration of the liquor was 12% by weight.

This solution was continuously taken out from the gas absorbing tower and reacted with aluminum hydroxide, while being stirred, the aluminum hydroxide being continuously added at a rate of 1.5 kg/hr. Thus, 4.8 kg/hr of crystalline aluminum fluoride trihydrate was obtained at a reaction temperature of 40° to 50° C. This slurry was continuously removed and filtered into a solid portion and a liquid portion. The liquid portion, a filtrate which contained about 4% by weight of aluminum fluoride, was recycled to the gas absorption process and the solid portion, which was almost pure aluminum fluoride trihydrate, was calcined at a maximum temperature of 500° C in a rotary kiln in air to obtain anhydrous aluminum fluoride of 90% by weight purity.

According to the present invention, as described above, high purity aluminum fluoride is easily obtained even from gases having a low concentration of fluorine compounds which produce aluminum fluoride with difficulty following the prior art. Therefore, the method of the present invention can be widely industrially applied and is economically advantageous.

While the invention has been described in detail and with reference to specific embodiments thereof, it will be apparent to one skilled in the art that various changes and modifications can be made therein without departing from the spirit and scope thereof.

What is claimed is:

1. A method for the production of aluminum fluoride from a gas containing a fluorine compound, which method comprises circulating between a gas absorbing zone and a storage zone a gas absorbing liquor comprising either water containing alumina or hydrated alumina, or an aqueous aluminum fluoride solution containing alumina or hydrated alumina, introducing said gas into said gas absorbing zone and absorbing said gas into said gas absorbing liquor whereby the absorbed fluorine compound is reacted with alumina or hydrated alumina to precipitate the fluorine as hydrated aluminum fluoride, filtering said precipitated hydrated aluminum fluoride from said gas absorbing liquor and recycling the filtrate from the filtration to the storage zone and recycling same therefrom into the absorbing zone.

2. A method according to claim 1, wherein said gas has a fluorine concentration of less than about 10 g/Nm$^3$.

3. A method according to claim 1, wherein said gas has a fluorine concentration of less than about 2 g/Nm$^3$.

4. A method according to claim 1, wherein said gas is an off gas from an aluminum electrolytic cell.

5. A method according to claim 1, wherein the amount of added alumina or hydrated alumina is 1 to 2 times that theoretically required based on the fluorine absorbed by said gas absorbing liquor.

6. A method according to claim 1, wherein said filtered aluminum fluoride hydrate is calcined into anhydrous aluminum fluoride.

7. A method for the production of aluminum fluoride from a gas containing a fluorine compound, which method comprises circulating between a gas absorbing zone and a storage zone a gas absorbing liquor comprising water containing alumina or hydrated alumina, an aqueous aluminum fluoride solution, or an aqueous aluminum floride solution containing alumina or hydrated alumina, introducing said gas into said gas absorbing zone and absorbing said gas into said absorbing liquor, introducing said gas absorbing liquor containing said gas into a reaction zone, adding alumina or hydrated alumina to the gas absorbing liquor in said reaction zone whereby said absorbed fluorine compound is reacted with said alumina or hydrated alumina to precipitate hydrated aluminum fluoride, filtering said hydrated aluminum fluoride from said gas absorbing liquor, and recycling the filtrate from the filtration to the storage zone and recycling same therefrom into the absorbing zone.

8. A method according to claim 7, wherein said filtered aluminum fluoride hydrate is calcined into anhydrous aluminum fluoride.

9. A method according to claim 7, wherein said gas has a fluorine concentration of less than about 10 g/Nm$^3$.

10. A method according to claim 7, wherein said gas has a fluorine concentration of less than about 2 g/Nm$^3$.

11. A method according to claim 7, wherein said gas is an off gas from an aluminum electrolytic cell.

12. A method according to claim 7, wherein said gas absorbing liquor is either water or an aqueous aluminum fluoride solution to which alumina or hydrated alumina is added in an amount of 20 to 80% of that theoretically required based on the fluorine absorbed by said liquor.

13. A method according to claim 7, wherein the total amount of said alumina or hydrated alumina is 1 to 2 times that theoretically required based on the fluorine absorbed by said liquor.

14. A method according to claim 7, wherein said gas absorbing liquor is an aqueous aluminum fluoride solution which is a filtrate recycled from the filtration process.

15. A method according to claim 1, wherein the pH of said gas absorbing liquor is less than about 6.

16. A method according to claim 7, wherein the pH of said gas absorbing liquor is less than about 6.

17. A method according to claim 1, wherein the concentration of alumina or hydrated alumina in said gas absorbing liquor is lower than about 10% by weight.

18. A method according to claim 7, wherein the concentration of alumina or hydrated alumina in said gas absorbing liquor is lower than about 10% by weight.

* * * * *